United States Patent [19]

Allori

[11] Patent Number: 4,473,144
[45] Date of Patent: Sep. 25, 1984

[54] TRANSMISSION CLUTCH HUB
[75] Inventor: Aldo Allori, Brookfield, Ill.
[73] Assignee: International Harvester Co., Chicago, Ill.
[21] Appl. No.: 379,429
[22] Filed: May 18, 1982
[51] Int. Cl.³ .................. F16D 13/72; F16D 13/74; F16D 25/063
[52] U.S. Cl. ..................... 192/70.12; 192/85 AA; 192/113 B; 415/113; 188/264 D
[58] Field of Search ........... 192/70.12, 85 AA, 113 B; 415/113; 188/264 D, 264 AA

[56] References Cited
U.S. PATENT DOCUMENTS

| | | | |
|---|---|---|---|
| 1,759,755 | 5/1930 | Lindner | 192/70.12 X |
| 2,523,501 | 9/1950 | Davies et al. | 192/70.12 X |
| 2,642,971 | 6/1953 | Hagenbook | 192/113 B X |
| 2,670,828 | 3/1954 | McFarland | 192/85 AA |
| 3,157,057 | 11/1964 | Palmer et al. | 192/70.12 X |
| 3,587,537 | 6/1971 | Spokas et al. | 192/70.12 X |
| 3,736,813 | 12/1971 | Kress et al. | 74/740 |
| 3,912,060 | 10/1975 | Handke | 192/113 B |

Primary Examiner—Rodney H. Bonck
Assistant Examiner—David D. House
Attorney, Agent, or Firm—Boris Parad; F. David AuBuchon

[57] ABSTRACT

A clutch hub for a motor vehicle transmission is used for transferring torque to a driven shaft rigidly and detachably connected thereto. The hub body comprises inclined tunnels with slanted corridors providing additional rotational effect and more even fluid distribution through intake ports. The hub also comprises a frusto-conical protuberance base blocking the fluid flow from a fluid intake chamber into a clutch hub chamber.

7 Claims, 4 Drawing Figures

TRANSMISSION CLUTCH HUB

BACKGROUND OF THE INVENTION

1. Field of the Invention

This invention pertains to clutch hubs and more particularly to transmission clutch hubs being mounted on a shaft for transferring power thereto.

2. Description of the Prior Art

The prior art is replete with various arrangements for transmission clutch hubs. For instance, the U.S. Pat. No. 3,736,813, issued to Kress et al, discloses an annular member which is splined to a supporting shaft and disposed within the planetary carrier. Hydraulically actuated clutch connects and disconnects the carrier from this annular member in order to engage and disengage the entire transmission.

However, none of the prior art references of record describes, illustrates or suggests the novel transmission clutch hub as disclosed in the subject invention.

SUMMARY OF THE INVENTION

According to the present invention, a clutch hub in a motor vehicle transmission comprises a body of an essentially cylinder shaped configuration. The hub body comprises an outer wall including splines for a releasable connection and carrying associated friction disks. An annular inner wall forms a hub center opening extending through said hub body. The annular inner wall has means for mounting on and transferring torque to an associated driven shaft projecting through the center opening. A plurality of circumferentially and equi-distantly spaced tunnels perforate the clutch hub between its inner and outer walls. The clutch hub comprises an essentially frusto-conical protuberance on one side thereof. This protuberance blocks an admission of hydraulic fluid flow from an intake chamber into a clutch chamber, thereby forcing it to move into the tunnels.

BRIEF DESCRIPTION OF THE DRAWINGS

FIG. 3 is a side view of the clutch hub taken substantially along the lines 3—3 in FIG. 1;

FIG. 4 is a cross-sectional view of the clutch hub taken substantially along the lines 4—4 in FIG. 3.

DESCRIPTION OF THE PREFERRED EMBODIMENT

The invention may be carried into practice in a number of ways, but one specific embodiment will be described by way of example only.

Figure 1:
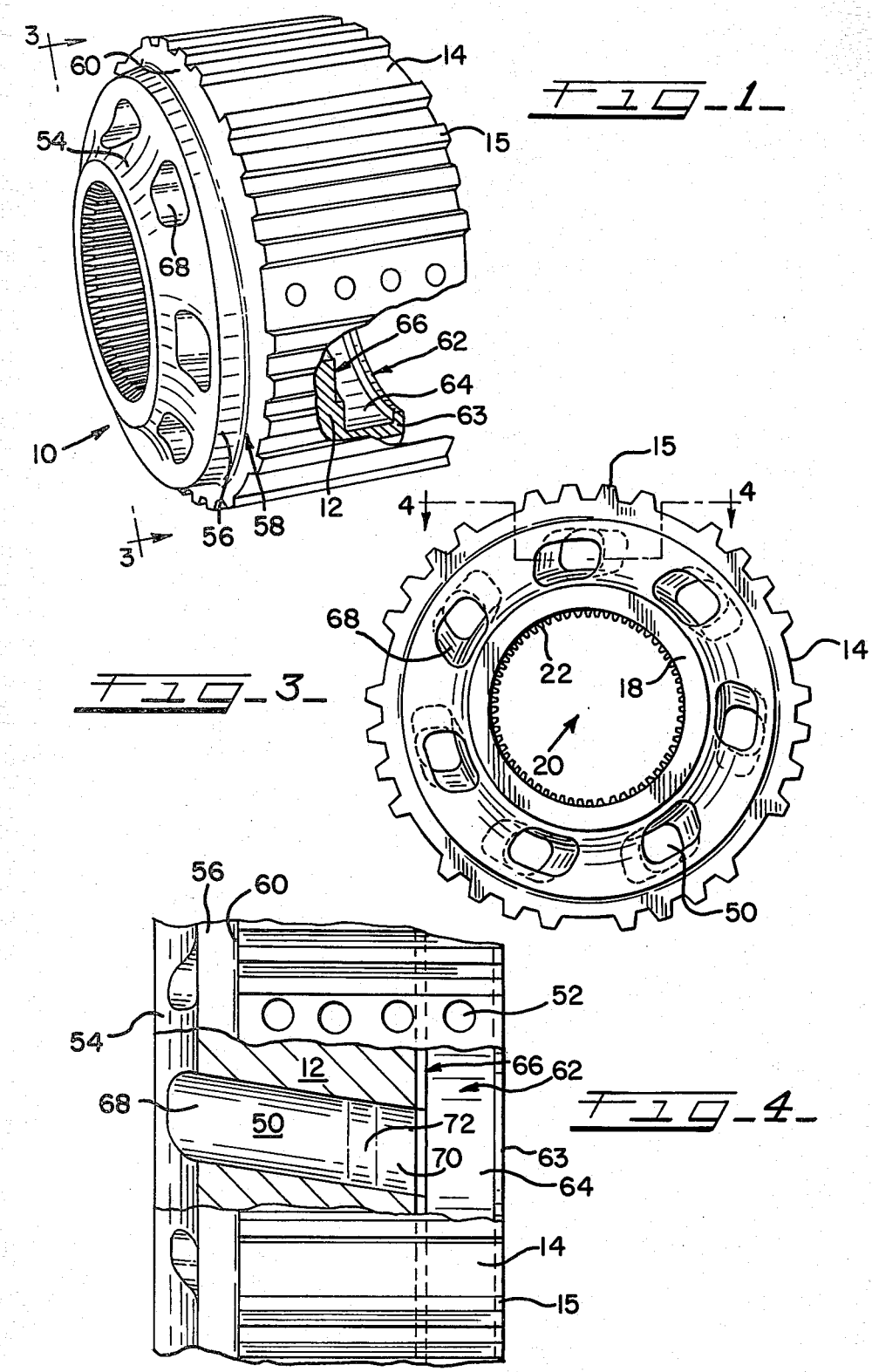
FIG. 1 is a perspective, illustrative view of a transmission clutch hub.
Figure 2:
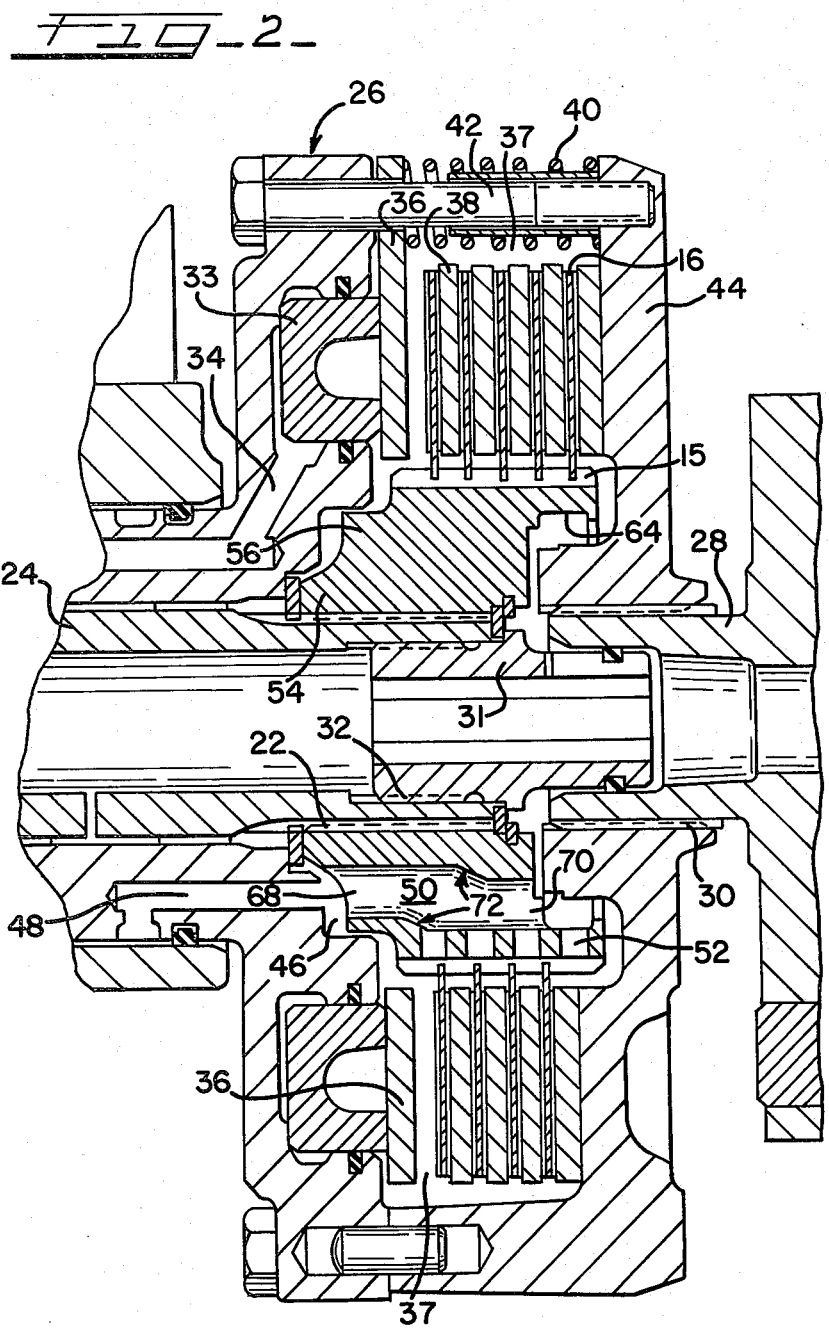
FIG. 2 is a cross-sectional view of a transmission clutch assembly including the clutch hub.

Referring now to the drawings, wherein reference characters designate like or corresponding parts throughout the several views, there is shown in FIGS. 1, 2, 3, and 4 a clutch hub 10 having an essentially cylinder-shaped body wall 12. The hub body wall 12 includes an outer wall portion 14 including splines 15 for releasable connection with friction disks 16. The hub body wall 12 includes an inner annular wall portion 18 forming a center opening 20 extending through the clutch hub body 12. The inner annular wall portion 14 includes splines 22 which facilitate attachment of the clutch hub 12 to a driven shaft 24 supporting the clutch hub 10 and being transferred torque and power therefrom. As shown in FIG. 2, the clutch hub 10 is mounted within the clutch housing 26 being rotated by a driving stub or carrier 28, which is secured to the housing 26 by vurtue of splines 30 or other suitable mechanical means. The driving stub 28 is aligned with the driven shaft 24 by a sleeve 31 detachably connected to the driven shaft 24 by a threaded portion 32 and slidable within the driving stub 28.

Hydraulic piston 33 disposed within the housing 26 is reciprocably movable therein. The piston 33 is hydraulically actuated by the supply of the hydraulic fluid coming through the supply channel 34 connected with a vehicle hydraulic system. The piston 33 includes a piston plate 36 reciprocably movable within a clutch chamber 37 inside the housing 26. Upon supply of the oil into the hydraulic 33, the plate 36 pushes separator plates 38, which are rigidly attached to the clutch housing 26, into a frictional engagement with friction disks 16. The disks 16 are alternatively interleaved between separator plates 38 for conjoint rotation. The plate 36 during the piston acutation squeezes piston return springs 40 supported by guiding pins 42 projecting therethrough and screwed into a front wall 44 of the housing 26. The front wall 44 arrests the longitudinal displacement of the friction disks 16 and separator plates 38.

An intake chamber 46 in the housing 26 is filled with a hydraulic fluid supplied through a passage 48 communicating with a vehicle hydraulic system. The hydraulic fluid, usually oil, is ejected form the passage 48 into the clutch hub tunnels 50. The tunnels 50 are equi-distantly and circumferentially disposed in the hub body 12 between outer and inner walls thereof 14 and 18, respectively. The tunnels 50 are slightly inclined with respect to center longitudinal and verticaly planes of the clutch hub, as shown in FIGS. 3 and 4. The angle is approximately 10 degrees, so as to provide an additional rotating moment for the clutch hub. A cross-section of the tunnels 50 in the plane perpendicular to its longitudinal axis has a parallelogram-like configuration. The outer wall 14 is perforated by a plurality of intake ports or apertures 52, communicating with the tunnels 50. As best shown in FIG. 1, the hub body 12 includes a frusto-conical protuberance 54 on one side thereof having a cylinder-shaped base or shoulder 56. The base 56 forms a race 58 with a hub front wall 60. The shoulder 56 functions as a dam blocking an entry of the hydraulic fluid from the intake chamber 46 into the clutch chamber 37, so that fluid admitted through the passage 48 will be forced to move into the tunnels 50.

On the hub side being opposite to the protuberance 54, there is a cavity 62. The side wall 63 thereof includes an annular groove 64. The cavity 62 has a bottom platofrm 66 communicating with the center opening 20 and tunnels 50. Each tunnel 50 comprises a lower portion 68 communicating with the protuberance 54 and upper portion 70 communicating with the platform 66. The upper and lower or end portions 70 and 68, respectively, are linked by a corridor 72 slanted toward the protuberance 54 under approximately 30° angle relative to the tunnel longitudinal axis.

In operation, the hydraulic fluid, such as oil or other similar substance effused into the intake chamber 46 is entrained into the or tunnels 50 and ejected therefrom through the ports 52 due to the centrifugal force exerted thereon by friction disks rotation. The rotating disks are somewhat like a centrifugal pump ejecting the oil radially outwardly between the adjacent disks and separator plates. From the tunnels 50 the fluid is ejected through the intake ports or apertures 52 into the clutch chamber 37. The fluid is forced to go through the ports 52 since the fluid admission into the clutch chamber 37 from the chamber 46 is blocked by the shoulder 56. The intake ports 52 located in-line along some of the tunnels 50 serve to conduct the hydraulic fluid outwardly to friction disks in order to dissipate heat generated by frictional engagement of the disks and separator plates. The angled tunnels 50 create a propeller-like effect in order to increase the rotating moment of the clutch hub and more efficiently to distribute the fluid from the tunnels 50 into the clutch chamber 37. The slanted corridor 72 guides the impelled fluid into a distal or cavity end of the clutch hub 10 in order to more evenly distribute the fluid flow throughout the ports 52.

The foregoing description and drawings merely illustrate the preferred embodiment and the invention is not limited thereto, except insofar as the appended claims are so limited, and so those skilled in the art who will have the disclosure before them, will be able to make modifications and variations therein without departing from the scope of the invention.

What is claimed is:

1. In a motor vehicle transmission, a clutch hub having an essentially cylinder-shaped body and a wall comprising:

an outer wall portion including means for releasable connection with and carrying friction disks thereon;

an annular inner wall portion forming a hub center opening extending through said hub body;

said annular inner wall portion having means for mounting on and transferring torque to an associated driven shaft projecting through said center opening;

a plurality of circumferentially and equidistantly spaced tunnels perforating said hub body wall along and between said inner and outer wall portions without intersecting thereof;

said clutch hub comprising a protuberance on one side thereof blocking an admission of hydraulic fluid flow from an intake chamber into a clutch chamber, thereby forcing said fluid to move into said tunnels;

said tunnels being angled relative to longitudinal and vertical center planes of said hub body wall in order to provide a propeller-like effect increasing the fluid rotational impetus on said clutch hub body wall.

2. The invention according to claim 1, and said protuberance including a cylinder-shaped base forming a race with a clutch hub body front wall.

3. The invention according to claim 1, and said outer wall portion being perforated with a plurality of ports equi-distantly spaced along a clutch hub longitudinal axis and communicating with said tunnels in order to provide an access of cooling fluid flow to said clutch chamber encompassing said friction disks.

4. The invention according to claim 1, and said tunnels having a generally oblong configuration in a cross-section taken across their longitudinal axis.

5. The invention according to claim 1, and said hub body having an annular center cavity being located in opposition to said frusto-conical protuberance;

said cavity communicating with said center opening and said tunnels.

6. The invention according to claim 5, and each of said tunnels having one end communicating with said protuberance and another end communicating with said cavity;

said ends being interconnected by an inclined corridor guiding the fluid impelled into said tunnels toward intake ports disposed near said cavity, thereby providing more even distribution through said ports.

7. A transmission clutch hub having a cylinder-like configuration and a wall comprising:

an annular outer wall portion including splines for connection with associated friction disks;

an annular inner wall portion encompassing a hub center opening and having a spline for connection with an associated driven shaft;

a plurality of tunnels perforating said hub and angled relative to longitudinal and vertical planes of said hub;

a plurality of intake ports disposed in-line along said tunnels and communicating therewith, said tunnels having slanted corridors therein for guiding hydraulic fluid ejected into said tunnels into said ports for more even fluid distribution therethrough;

said hub comprising a frusto-conical protuberance having a shoulder for blocking a fluid by-pass of said tunnels at one end thereof and an annular cavity at another.

* * * * *